Patented Oct. 17, 1933

1,930,752

UNITED STATES PATENT OFFICE 1,930,752

CHLORINATION OF P-XYLIDINE

Emeric Havas and Henry R. Lee, South Milwaukee, Wis., assignors to E. I. du Pont de Nemours & Company, Wilmington, Del., a corporation of Delaware No Drawing. Application January 25, 1932
Serial No. 588,818

10 Claims. (Cl. 260—124)

This invention relates to a process of chlorinating para xylidine, to produce 5-chloro-2-amino-1, 4-dimethyl-benzene.

It is an object of this invention to devise a simple, economical and efficient method for obtaining 5-chloro-2-amino-1, 4-xylene in a high state of purity.

Other and further important objects of this invention will become apparent from the following description and appended claims.

In our copending application, Ser. No. 531,644, of which this is a continuation in part, it has been shown that if otoluidine is converted into its N-formyl derivative, the latter may be used as initial material in a novel process of preparing 5-chloro-2-amino-1-toluene which process is characterized by unusual simplicity of procedure, economy of materials, and general over-all efficiency. The dominant characteristic of said process consists of carrying out the chlorination of the formylamino body and subsequent hydrolysis of the formyl group in an organic medium immiscible with water, such as toluene.

We have now found that said process is applicable with equal advantage to the manufacture of 5-chloro-2-amino-1, 4-xylene. This compound constitutes a valuable intermediate for dyestuffs. It has been obtained in the art as a by-product in the reduction of mononitro-p-xylene with tin and hydrochloric acid. (Jannasch, Liebig's Annalen, vol. 176, page 55; 1874). More recently a method has been proposed to manufacture this compound by chlorinating 2-acetylamino-p-xylene. (Wheeler and Morse, Jour. Am. Chem. Soc., vol. 46, pages 2572-4). This method, however, suffers from the same objections as those mentioned in our copending application in conjunction with the chlorination of 2-acetylamino-1-toluene. High cost of initial materials, substantial waste of these in the course of the reaction, large excess of hydrochloric acid required for hydrolysis are among the major disadvantages of this process.

We have now found that by converting p-xylidine prior to chlorination into its corresponding formyl derivative, the entire process becomes susceptible of a series of simplifications and economies, which increase the efficiency of the entire process, considerably reduce its cost, and facilitate the separation of the desirable product from any isomers formed therewith.

The first and immediate advantage of the use of formic acid as acidylating agent, is that it costs considerably less, mole for mole, than glacial acetic acid.

Another important advantage made possible by the use of formic acid is available, since the formyl compound of p-xylidine which is formed is highly soluble in water-insoluble organic solvents such as toluene or benzene. This permits performing the entire process, namely, the chlorination and the hydrolysis in an inert organic medium, such as, for example, toluene, which can be efficiently recovered at the end of the reaction. Moreover, the use of toluene as a solvent in the chlorination step enables one to eliminate the heretofore necessary step of separating the chlorinated compound from the solvent before hydrolysis. Thus the materials, labor and time heretofore consumed in this step are saved. Furthermore, the use of toluene saves the hydrochloric acid formed in the chlorination step. Also, the formyl group is more readily hydrolyzed than the acetyl group. Consequently, the quantity of hydrochloric acid that must be added in the hydrolysis step is reduced to a mere fraction of the quantity required in heretofore known processes.

Other material advantages from the selection of formic acid as acidylating agent, and of an inert organic hydrocarbon as solvent, will appear from the detailed description below.

Without limiting our invention to any particular procedure, the following example, in which parts by weight are given, will serve to illustrate our method in its preferred form.

Example 242 parts of p-xylidine and 120 parts of 90% formic acid are heated together at about 100–103° C. for about 3 hours. The mass is then cooled to about 70° C. and 500 parts of toluene are added. The mass is now heated to distil off the excess of formic acid as well as any water that is present and then cooled to about 60° C. Additional toluene is now introduced into the mass to bring the total quantity of toluene to about 1800 parts. The toluene-diluted mass is cooled to about 20° C., and chlorine gas is passed into the mixture at 20° C. until 142 parts have been consumed. 50 parts of water are now added and 170 parts of an aqueous hydrochloric acid solution (20° Bé.) are introduced. The mass is heated at about 60–65° C. for about 2 hours, cooled to 20° C. and filtered. The filter cake constitutes the hydrochloride of 5-chloro-2-amino-1, 4-xylene in high yield and of sufficient purity to be applicable directly for technical purposes.

The filtrate consists of two phases: (1) An aqueous phase containing dissolved therein the excess hydrochloric acid and the hydrochloride of any isomeric chloro-xylidines formed, and (2) an oily phase from which the toluene may be recovered in pure form by steam distillation.

It will thus be seen that our novel process is exceedingly simple in operation, reduces the handling of materials to a minimum, saves hydrochloric acid, replaces the costly acidylating agent by the comparatively cheap formic acid, uses an inexpensive solvent for the reaction, and enables the recovery of the same without waste and at very little cost. Due to the great reduction in liquid volumes handled, the separation of 5-chloro-2-amino-p-xylene from its isomers is more complete and the product is obtained in a comparatively pure state.

If desired, the various intermediate products formed in the reaction may be isolated. The treatment of p-xylidine with formic acid in the first step of the above process results in formyl-amino-p-xylene (2-formylamino-1, 4-dimethyl-benzene). The chlorination of this product, according to the above process, yields 5-chloro-2-formylamino-1, 4-xylene and some isomeric derivatives. These chlorinated compounds may be isolated by neutralizing the reaction mass, and distilling off the toluene. The 5-chloro compound may be separated from its isomers by recrystallizing from toluene. It is a white crystalline substance, melting at 151° C. When a toluene solution thereof is treated with aqueous hydrochloric acid solution, the formyl group splits off, and the resulting amino group is converted into the HCl salt, which is insoluble in toluene, and therefore either dissolves in the aqueous phase or precipitates.

It will be understood that many variations and modifications are possible in the specific procedure disclosed, without departing from the spirit of this invention.

Thus, instead of chlorine gas, other chlorinating agents which are adapted for use in anhydrous media may be used, for instance, sulfuryl chloride. Instead of toluene, any other organic solvent may be used, provided it is a good solvent for formyl-para-xylidine, immiscible with water, and not readily chlorinated at low temperatures in the absence of a catalyst. Benzenoid solvents such as, for instance, benzene and chlor-benzene are specific examples of solvents that may be used in place of toluene.

We claim:

1. In the process of manufacturing a chlorinated para-xylidine compound, the step which comprises chlorinating formylamino-p-xylene.

2. In the process of manufacturing 5-chloro-2-amino-1,4-dimethyl-benzene, the steps comprising chlorinating formylamino-p-xylene and hydrolyzing the product to eliminate the formyl group.

3. As a new product, 5-chlor-2-formylamino-1,4-dimethyl-benzene.

4. In the process of chlorinating para-xylidine, the steps comprising reacting para-xylidine with formic acid, chlorinating the reaction product formed and hydrolyzing the resulting chlorinated product to eliminate the formyl group.

5. In the process of manufacturing chlorinated para-xylidine, the step which comprises effecting the chlorination of formyl-p-xylidine in an organic liquid medium which is immiscible in water.

6. In the process of manufacturing chlorinated para-xylidine, the step which comprises reacting with a chlorinating agent, formylamino-p-xylene dissolved in a benzenoid solvent.

7. In the process of manufacturing chlorinated para-xylidine, the step which comprises effecting the chlorination of formylamino-p-xylene in a medium of toluene.

8. In the process of preparing chlorinated para-xylidine, the step which comprises passing chlorine gas into a solution of formylamino-p-xylene in toluene.

9. A process of preparing a 5-chloro-2-amino-1,4-xylene compound, which comprises passing chlorine gas into a solution of formylamino-p-xylene in toluene, adding an aqueous hydrochloric acid solution, warming the mass to effect hydrolysis of the formyl group, and recovering the precipitated hydrochloride of 5-chloro-2-amino-1,4-xylene.

10. The process of preparing a 5-chloro-2-amino-1,4-xylene compound which comprises reacting upon amino-p-xylene with formic acid to produce formylamino-p-xylene, dissolving the latter in toluene, heating the mixture to eliminate excess formic acid and water, passing chlorine gas into the toluene solution of the formyl-amino-p-xylene, adding an aqueous hydrochloric acid solution, warming the mass to effect hydrolysis of the formyl group, and filtering to isolate the hydrochloride of 5-chloro-2-amino-1,4-xylene.

EMERIC HAVAS.
HENRY R. LEE.